United States Patent
Yoon et al.

(10) Patent No.: US 9,300,013 B2
(45) Date of Patent: Mar. 29, 2016

(54) BATTERY MODULE

(71) Applicant: SK Innovation Co., Ltd., Seoul (KR)

(72) Inventors: Sang Won Yoon, Daejeon (KR); Sang Bum Kim, Daejeon (KR); Hong Jae Koh, Daejeon (KR); Seung Noh Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 119 days.

(21) Appl. No.: 14/255,322

(22) Filed: Apr. 17, 2014

(65) Prior Publication Data

US 2015/0044543 A1 Feb. 12, 2015

(30) Foreign Application Priority Data

Apr. 18, 2013 (KR) ........................ 10-2013-0042666

(51) Int. Cl.
*H01M 10/42* (2006.01)
*H01M 2/20* (2006.01)
*H01M 2/02* (2006.01)
*H01M 2/34* (2006.01)

(52) U.S. Cl.
CPC .......... *H01M 10/4235* (2013.01); *H01M 2/021* (2013.01); *H01M 2/204* (2013.01); *H01M 2/206* (2013.01); *H01M 2/345* (2013.01); *H01M 2200/20* (2013.01)

(58) Field of Classification Search
CPC ..................... H01M 10/4235; H01M 2200/20; H01M 2/021; H01M 2/204; H01M 2/206; H01M 2/345
See application file for complete search history.

(56) References Cited

U.S. PATENT DOCUMENTS

| | | | | |
|---|---|---|---|---|
| 2002/0086205 A1* | 7/2002 | Payen | ................... | H01M 2/204 429/158 |
| 2005/0077878 A1* | 4/2005 | Carrier | ...................... | B25F 5/00 320/134 |
| 2006/0267545 A1* | 11/2006 | Lee | ..................... | H01M 2/1061 320/106 |
| 2009/0162744 A1* | 6/2009 | Zheng | ................... | H01M 2/206 429/120 |
| 2009/0223940 A1* | 9/2009 | Hosoya | ................ | B23K 15/008 219/121.64 |
| 2010/0247997 A1* | 9/2010 | Hostler | ............... | H01M 2/1077 429/120 |
| 2011/0052969 A1* | 3/2011 | Cai | ........................ | H01M 2/204 429/158 |
| 2011/0223478 A1* | 9/2011 | Han | ........................ | H01M 2/20 429/211 |
| 2012/0094161 A1* | 4/2012 | Zheng | ................... | H01M 2/024 429/94 |
| 2012/0231300 A1* | 9/2012 | Park | .................... | H01M 10/425 429/7 |

* cited by examiner

*Primary Examiner* — Carlos Barcena
(74) *Attorney, Agent, or Firm* — The Webb Law Firm

(57) ABSTRACT

Provided is a battery module having improved safety by disconnecting an electrical connection due to short-circuit of electrode tabs by bending the electrode tabs upwardly extended to form welding parts having welding surfaces in a direction perpendicular to the battery module, performing a spot laser welding on the welding parts in a lap welding scheme using a top-hat-type laser beam or a Gaussian-type laser beam, and including a swelling partition to adjust a swelling position when a swelling increasing a volume due to a problem in a battery cell occurs and to short-circuit the electrode tabs.

5 Claims, 7 Drawing Sheets

BATTERY MODULE

TECHNICAL FIELD

The following disclosure relates to a battery module, and more particularly, to a battery module capable of improving safety of a battery cell by short-circuiting electrode tabs in the case in which a volume is increased due to a problem in the battery cell to disconnect an electrical connection.

BACKGROUND

Generally, since a secondary battery may be charged and discharged unlike a primary battery, the secondary battery has been applied to various fields such as a digital camera, a cellular phone, a notebook computer, and a hybrid vehicle and has been actively studied. Examples of the secondary battery may include a nickel-cadmium battery, a nickel-metal hydride battery, a nickel-hydrogen battery, a lithium secondary battery, and the like.

Among these secondary batteries, the lithium secondary battery having high energy density and discharging voltage has been mainly studied and has been commercialized and widely used. The lithium secondary battery may be manufactured in various types. As a typical type of the lithium secondary battery, there are a cylinder type and a prismatic type that may be mainly used for a lithium ion battery. A lithium polymer battery that has been recently spotlighted is manufactured in a pouched type having flexibility, such that a shape thereof is relatively free. A plurality of pouched type of battery cells are generally used by connecting with each other to configure a module form. In this case, an electrical connection of each of the battery cells is formed by a connection of an electrode tab protruded to the outside of the battery cell. The module has risks of fire, combustion and explosion due to decay of a molecular structure or internal short-circuit upon overcharging or overdischarging of the secondary battery. For this reason, various methods such as a safety vent, a positive temperature coefficient (PTC), a current interrupt device (CID), and the like are used to secure safety of the battery cell. These methods mainly take advantage of a scheme of minimizing the risks of the fire, the combustion, and the explosion by damaging a predetermined region of the battery cell and decreasing an internal pressure using the damaged predetermined region. However, according to the methods described above, the damaged region of the battery cell is irregularly formed, such that an internal electrolyte may be leaked to the outside through the damaged region.

SUMMARY

An embodiment of the present invention is directed to short-circuiting electrode tabs by bending the electrode tabs upwardly extended to form welding parts having welding surfaces in a direction perpendicular to a battery module, performing a spot welding on the welding parts in a lap welding scheme or a butt welding scheme using a top-hat-type laser beam or a Gaussian-type laser beam, and including a swelling partition to adjust a swelling position in the case in which a swelling increasing a volume due to a problem in a battery cell occurs. Therefore, an embodiment of the present invention is directed to providing a battery module having improved safety of the battery cell by disconnecting an electrical connection by short-circuit of the electrode tabs to suppress the swelling.

In one general aspect, a battery module 100 includes two or more battery cells and electrode tabs extended from the respective battery cells and welded to each other by laser, wherein the battery module 100 is formed so that the electrode tabs 120 upwardly extended are bent to include welding parts 121 having welding surfaces in a direction perpendicular to the battery cells 110.

The electrode tabs 120 may be welded by a lap welding scheme in which the welding parts 121 of the electrode tab 120 of an anode and the electrode tab 120 of a cathode neighboring to each other are welded in a state in which they are lapped or by a butt welding scheme in which end portions of the welding parts 121 of the electrode tab 120 of an anode and the electrode tab 120 of a cathode neighboring to each other are welded in a state in which they contact.

The welding parts 121 may be welded using a top-hat-type laser beam or a Gaussian-type laser beam and the welding parts 121 may be welded using a spot laser welding.

The battery module 100 may have a swelling partition 130 guiding a swelling position of the battery cell 110 and formed to enclose the battery cell 110 at a predetermined lower region of the battery cell 110.

DETAILED DESCRIPTION OF MAIN ELEMENTS

Figure 1:
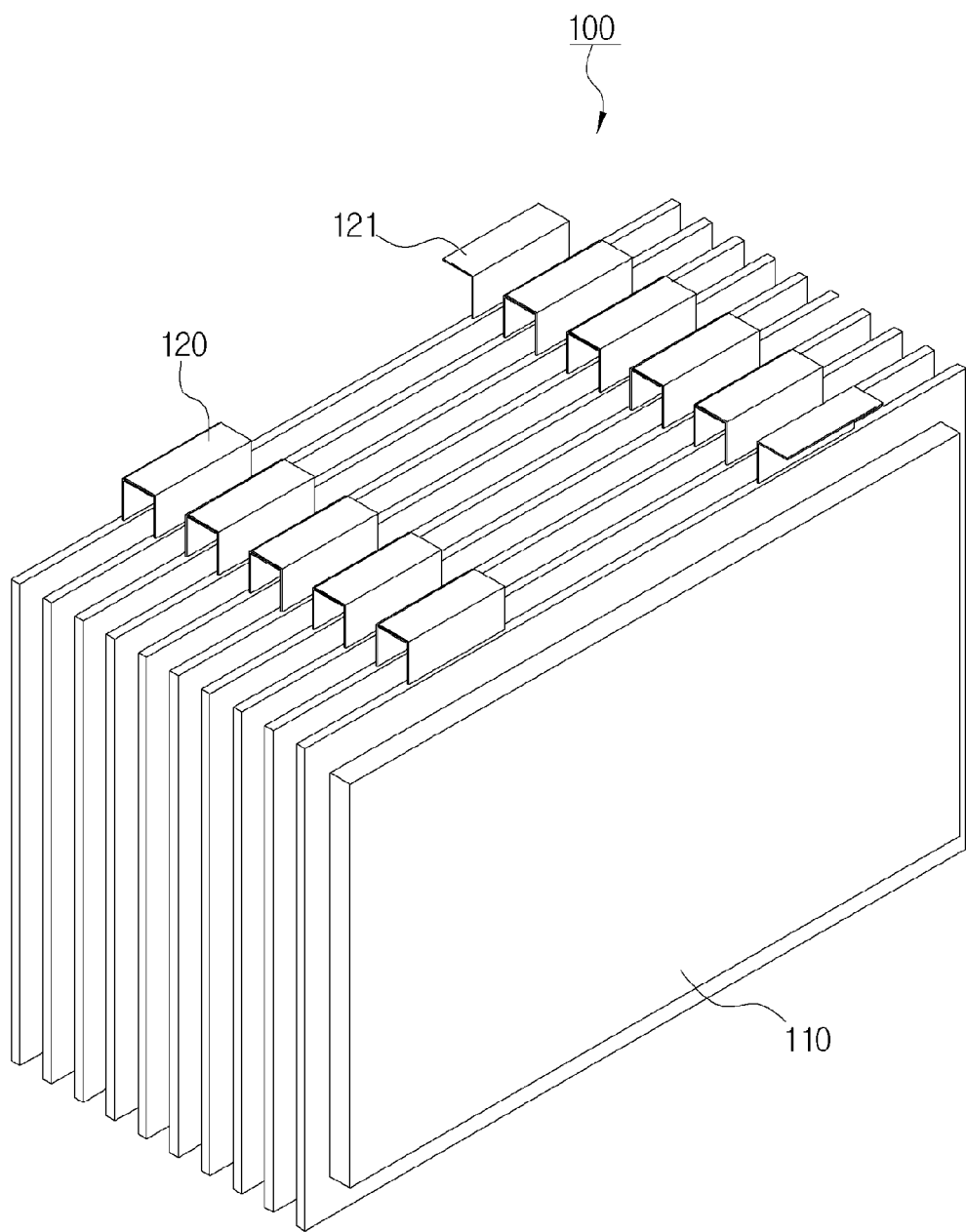
FIG. 1 is a perspective view of a battery module according to an embodiment of the present invention.

100: battery module
110: battery cell
120: electrode tab
121: welding part
130: swelling partition

DETAILED DESCRIPTION OF EMBODIMENTS

Hereinafter, a battery module according to an embodiment of the present invention as described above will be described in detail with reference to the accompanying drawings. The drawings of the present invention to be described below are provided by way of example so that the idea of the present invention can be sufficiently transferred to those skilled in the art to which the present invention pertains. Therefore, the present invention is not be limited to the drawings provided below but may be modified in different forms. In addition, like reference numerals denote like elements throughout the specification.

Figure 2:
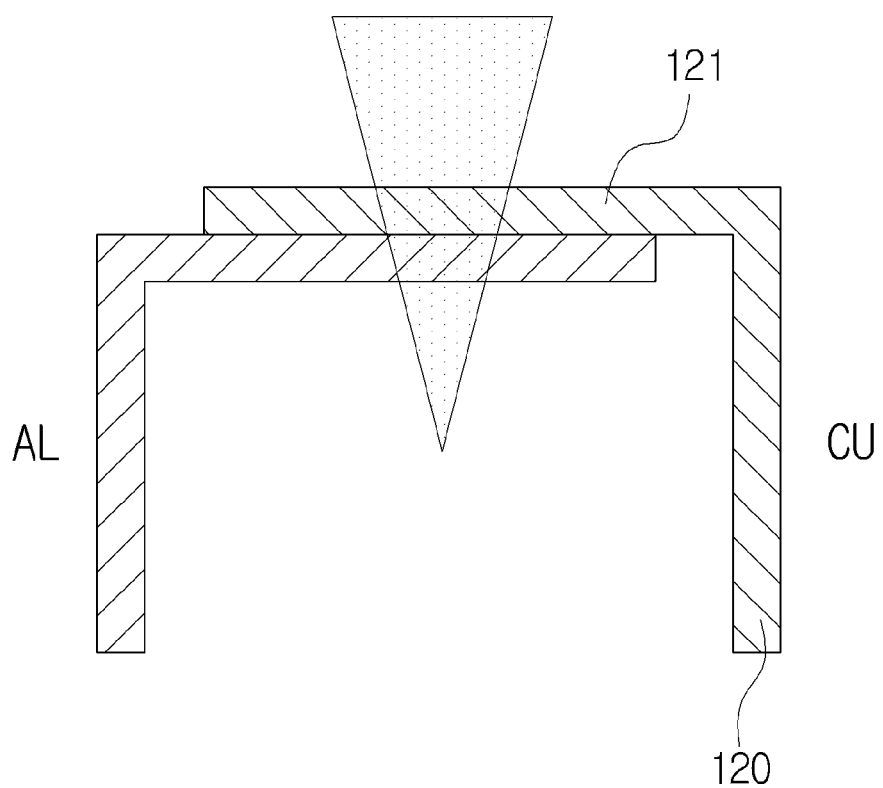
FIG. 2 is a diagram showing an example of a lap welding according to an embodiment of the present invention.
Figure 3:
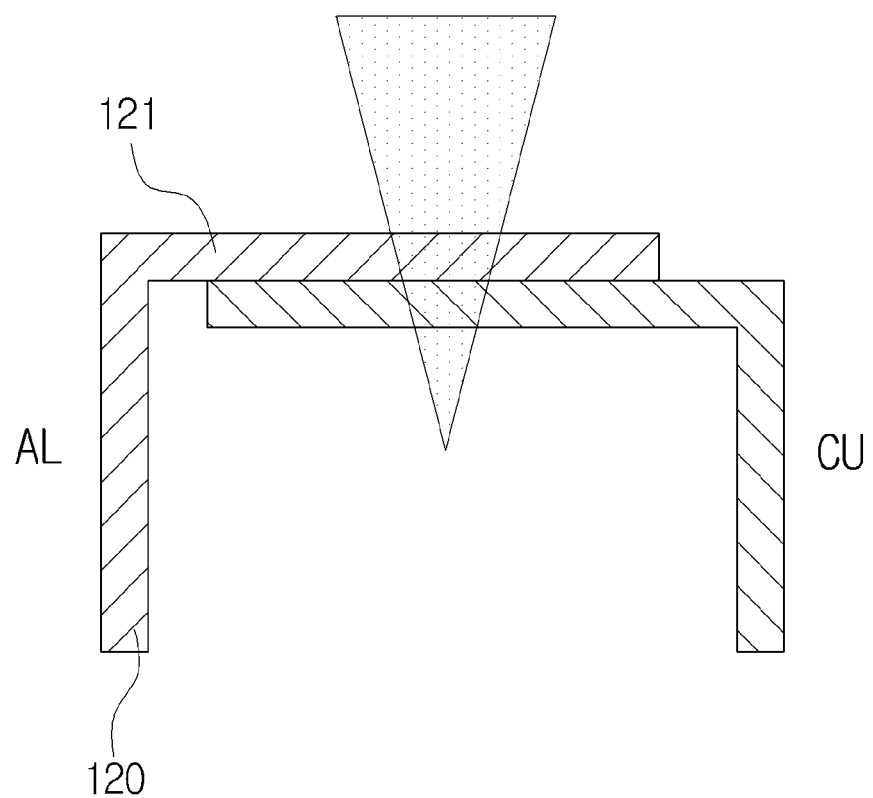
FIG. 3 is a diagram showing another example of a lap welding according to an embodiment of the present invention.
Figure 4:
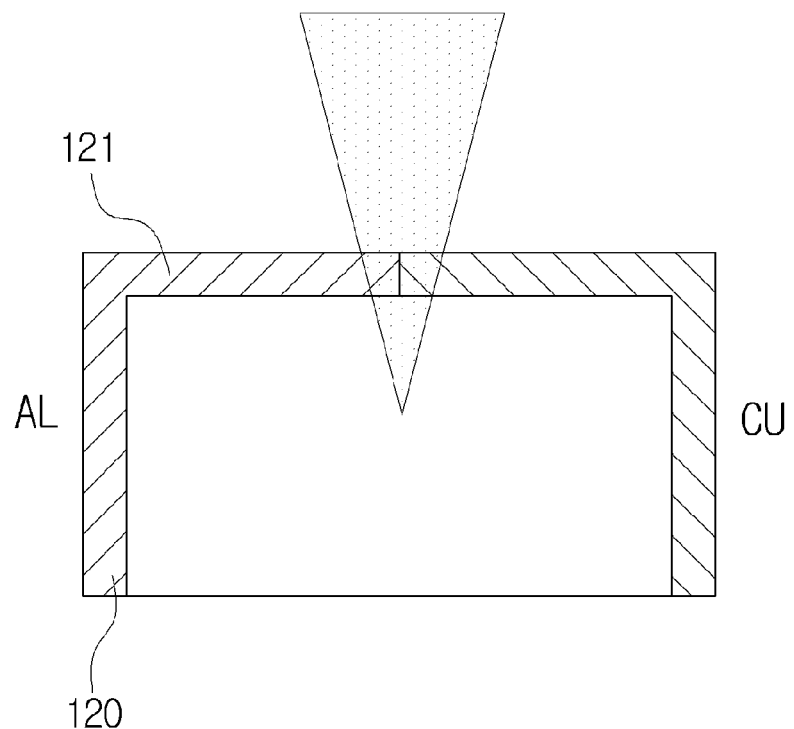
FIG. 4 is a diagram showing an example of a butt welding according to an embodiment of the present invention.
Figure 5:
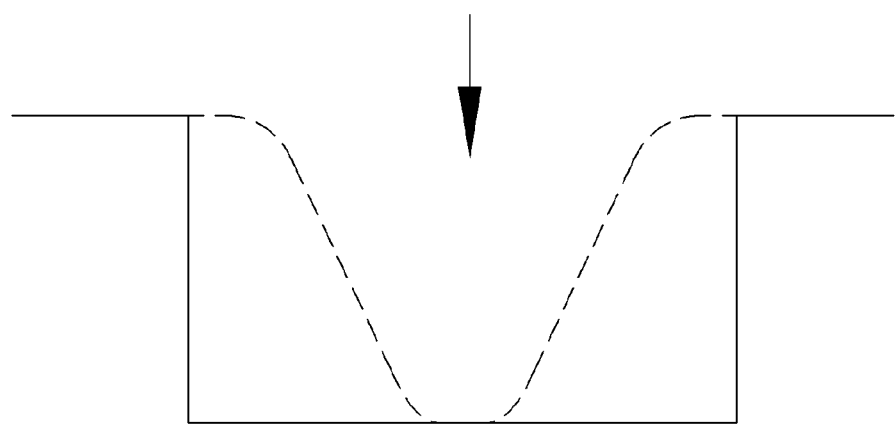
FIG. 5 is a diagram showing a symmetric gauss type laser beam according to an embodiment of the present invention.
Figure 6:
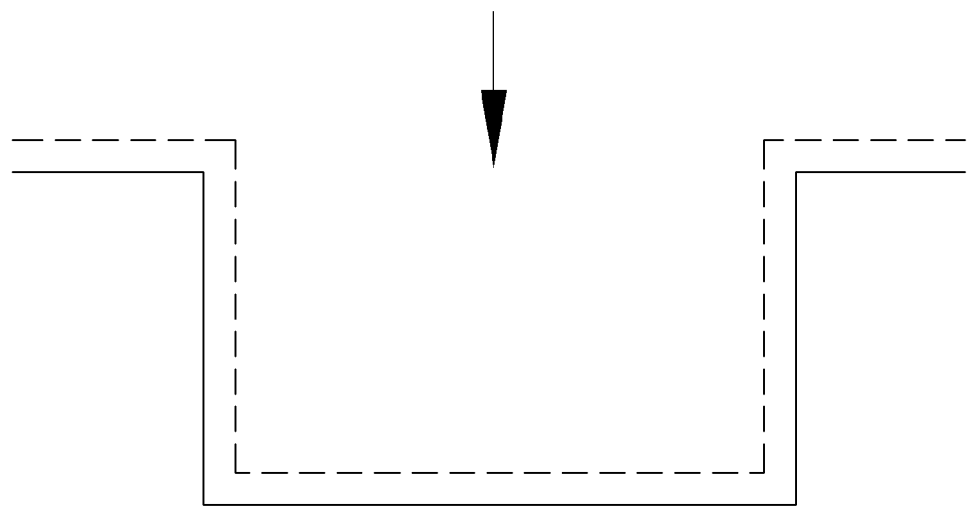
FIG. 6 is a diagram showing a top-hat-type laser beam according to an embodiment of the present invention.
Figure 7:
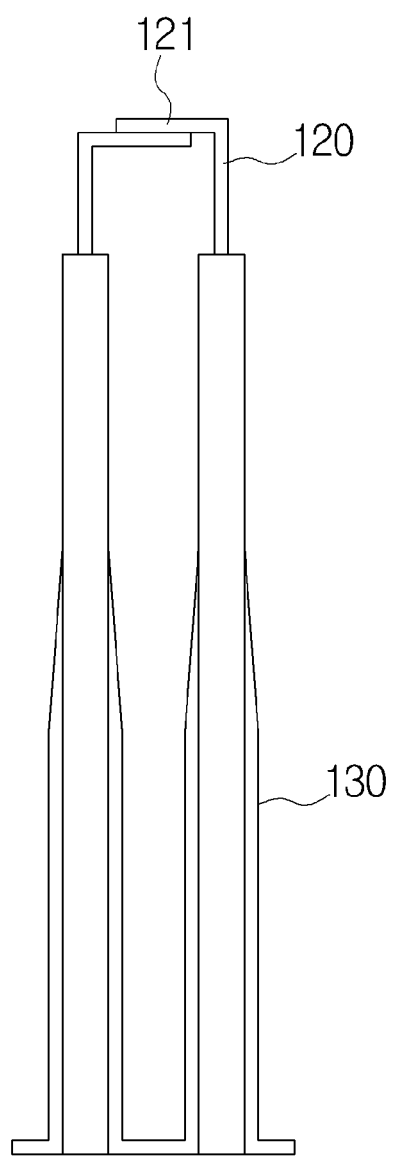
FIG. 7 is a diagram showing an example of a swelling partition according to an embodiment of the present invention.
Figure 8:
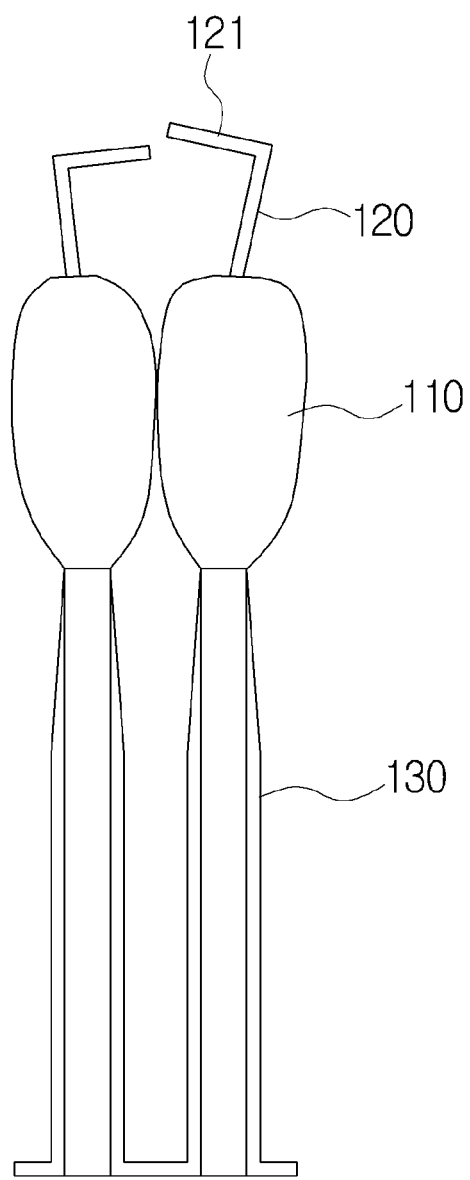
FIG. 8 is a diagram showing another example of a swelling partition according to an embodiment of the present invention.

FIG. 1 is a perspective view of a battery module according to an embodiment of the present invention, FIG. 2 is a diagram showing an example of a lap welding according to an embodiment of the present invention, FIG. 3 is a diagram showing another example of a lap welding according to an embodiment of the present invention, FIG. 4 is a diagram showing an example of a butt welding according to an embodiment of the present invention, FIG. 5 is a diagram showing a symmetric gauss type laser beam according to an embodiment of the present invention, FIG. 6 is a diagram showing a top-hat-type laser beam according to an embodiment of the present invention, FIG. 7 is a diagram showing an example of a swelling partition according to an embodiment of the present invention, and FIG. 8 is a diagram showing another example of a swelling partition according to an embodiment of the present invention.

A battery module 100 according to an embodiment of the present invention is configured to include two or more battery cells 110 and electrode tabs 120 extended from the battery cells 110 and welded to each other by laser, as shown in FIG. 1.

In this case, the battery module 100 is formed so that the electrode tab upwardly extended is bent to form a welding part 121 having a welding surface in a direction perpendicular to the battery cell 110. In addition, the electrode tabs 120 may be welded in a lap welding scheme in which the welding parts 121 of an electrode tab 120 of an anode and an electrode tab 120 of a cathode neighboring to each other are welded in a state in which they are lapped, or the electrode tabs 120 may be welded in a butt welding scheme in which end portions of the welding parts 121 of the electrode tab 120 of the anode and the electrode tab 120 of the cathode neighboring to each other are welded in a state in which they contact.

That is, the welding parts 121 are upwardly extended from the respective battery cells 110 to have a predetermined region bent in a direction perpendicular to the battery cells 110, and the welding parts 121 formed by bending the electrode tabs 120 may have a structure in which the electrode tab 120 of the anode and the neighboring electrode tab 120 of the cathode are lapped. The lapped welding parts 121 as described above are welded at a predetermined central region using the lap welding or the butt welding performing the welding by laser.

As shown in FIGS. 2 and 3, since the lap welding welds a predetermined region by single laser, a welding work may be simple. In addition, since the lap welding has a lapped portion wider than other welding schemes, a welding defect caused by a tracking error of the welding portion which may be caused during the welding work in the case in which the welding portion is narrow may be minimized, thereby making it possible to minimize a process defect rate.

In addition, as shown in FIG. 4, since the butt welding welds the end portions of the welding parts 121 in a state in which they contact, it may short-circuit the welding parts 121 easier than other welding schemes, such that the welding parts may be more rapidly short-circuited in the case in which an abnormal occurs in the battery module and the swelling occurs.

In addition, FIGS. 2 to 4 illustrate cases in which the electrode tab 120 according to the embodiment of the present invention is made of an aluminum material and a copper material. In this case, in order to closely adhere the respective electrode tab 120 to more efficiently perform the welding, it is preferable to configure the electrode tab 120 having a three-point support in which both end portions and a central portion have supporting force.

In order to configure the three-point support, the respective electrode tabs 120 may advantageously have a predetermined regularity in forming the welding parts 121. In this case, according to a rule of forming the welding parts 121, it is preferable to form the aluminum material to have a smaller radius because the aluminum material used in the electrode tab 120 generally has an elongation percentage of 9% or more and the copper material has the elongation percentage of 6% or more. That is, since the aluminum material having a high elongation percentage may be stretched when it is welded to the copper material, it is preferable to form the aluminum material to be shorter than the copper material.

In addition, the welding parts 121 may be welded using a top-hat-type laser beam or a Gaussian-type laser beam. The laser generally used in the welding is shown in FIG. 5 as a symmetric gauss type laser beam. The symmetric gauss type laser beam has an energy density that is not uniform and is concentrated on the center. Therefore, peripheral portions having a low energy density are not deeply penetrated into a basic material which is a welding target, such that welding efficiency may be deteriorated. In order to solve the problem described above, the present invention uses the top-hat-type laser beam as shown in FIG. 6. The top-hat-type laser beam described above has uniform energy densities of the peripheral portions and the center, such that the peripheral portions and the center may be penetrated into the basic material which is the welding target at the same depth.

In addition, the welding parts 121 may be welded using a spot laser welding. The spot laser welding forms a basis for selecting the number of spots of a spot welding by calculating the number of spots based on tensile strength when an existing linear welding having a predetermined width and welding a predetermined region has been used. That is, the number of spots is selected by dividing a welding area when the linear welding has been used by an area of spots used for the spot welding, such that the welding may be performed. Therefore, the linear laser welding and the spot laser welding have the same welding area, but have different welding positions.

This results from a fact that the linear laser welding may perform the welding only at a fixed region, but since the spot laser welding may move a position of the welding spot, it may adjust the positions of the welding spots, as needed. The battery module according to the embodiment of the present invention configures the welding spots using the spot laser welding so that the welding parts may be separated and short-circuited using physical force generated at the time of an occurrence of the swelling of the battery module. In this case, the welding spots may be overlapped.

In addition, the battery module 100 according to the embodiment of the present invention may have swelling partition 130 guiding the swelling position of the battery cell 110 and formed to enclose the battery cell 110 at a predetermined lower region of the battery cell 110. The swelling occurred in a form in which the battery cell 110 is expanded by an internal chemical reaction thereof due to reasons such as penetration, leaving at a high temperature, overcharging, external short-circuit, and the like has occurrence positions and forms thereof showing differences depending on the respective occurrence reasons In addition, the swelling omnidirectionally expands the battery cell 110 from the occurrence portion thereof, such that the physical force is distributed.

Therefore, in order to use the physical force generated when the battery cell is deformed due to the swelling, the physical force needs to be concentrated on a region having need of the physical force. In order to concentrate the physical force, a guide member for concentrating the swelling omni-directionally expanding the battery cell 110 on the region having need of the physical force may be required. To this end, the battery module may concentrate the swelling position on an upper side at which the electrode tab 120 is located using the swelling partition 130 formed to enclose the battery cell 110 at the predetermined lower region of the battery cell 110 as shown in FIG. 7.

As shown in FIG. 8, as the swelling position is concentrated on the upper side by guiding the swelling partition 130 located at the lower side, the physical force generated by the swelling is concentrated on the upper side, such that the connection of the electrode tabs 120 may be short-circuited.

That is, the swelling partition 130 formed to enclose the lower side of the battery cell 110 prevents the elongation of the lower side of the battery cell 110 by the swelling of the battery cell 110 generated due to the problems such as the penetration, the leaving at the high temperature, the overcharging, and the external short-circuit, such that the swelling may be concentrated on the upper side. In this case, the connection of the welding parts 121 of the electrode tabs 120 formed at the upper side of the battery cell 110 is short-circuited using the physical force of the swelling concentrated on the upper side to block an electrical connection, such that the chemical reaction may be minimized and the progression of the swelling may be consequently stopped. Therefore, the battery module according to the embodiment of the present invention may prevent an safety accident such as explosion or ignition of the battery cell 110 without having a separate electrical blocking unit or a battery cell protecting unit, and may consequently increase the number of the battery cells 110 which may be connected to the battery module having the same size.

According to the embodiment of the present invention, in the battery module, the electrode tabs upwardly extended is bent to form the welding parts having the welding surfaces in the direction perpendicular to the battery module and the spot welding is performed on the welding parts in the lap welding scheme or the butt welding scheme using the top-hat-type laser beam or the Gaussian-type laser beam, such that the electrode tabs are stably coupled in the ordinary case, but are short-circuited at the time of occurrence of the swelling in which the volume of the battery cell is increased, thereby making it possible to block the progression of the swelling.

In addition, since the swelling position is adjusted by including the swelling partition, the physical force necessary to short-circuit the electrode tabs may be efficiently supplied. By the configuration described above, since the occurrence of the swelling may be maximally suppressed using the electrical short-circuit in the state in which the sealing force of the battery cell is not lost when the swelling occurs due to the abnormal in the battery cell, the electrolyte, or the like in the battery cell may not be leaked to the outside and the pressure in the battery cell may be more safely managed.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A battery module including two or more battery cells and electrode tabs extended from the respective battery cells and welded to each other by laser,
   wherein the battery module is formed so that the electrode tabs upwardly extended are bent to include welding parts having welding surfaces in a direction perpendicular to the battery cells, wherein the battery module has swelling partitions guiding a swelling position of the battery cells and formed to enclose the battery cells at a predetermined lower region of the battery cells.

2. The battery module of claim 1, wherein the electrode tabs are welded by a lap welding scheme in which the welding parts of the electrode tab of an anode and the electrode tab of a cathode neighboring to each other are welded in a state in which they are lapped.

3. The battery module of claim 1, wherein the electrode tabs are welded by a butt welding scheme in which end portions of the welding parts of the electrode tab of an anode and the electrode tab of a cathode neighboring to each other are welded in a state in which they contact.

4. The battery module of claim 1, wherein the welding parts are welded using a top-hat-type laser beam or a Gaussian-type laser beam.

5. The battery module of claim 1, wherein the welding parts are welded using a spot laser welding.

* * * * *